US 12,389,973 B2

(12) United States Patent
Cohen

(10) Patent No.: US 12,389,973 B2
(45) Date of Patent: Aug. 19, 2025

(54) HELMET PROVIDED WITH A HALF CHIN BAR

(71) Applicant: Racing Force International W.L.L., Sakhir (BH)

(72) Inventor: Stephane Cohen, Msida (MT)

(73) Assignee: RACING FORCE INTERNATIONAL W.L.L., Sakhir (BH)

( * ) Notice: Subject to any disclaimer, the term of this patent is extended or adjusted under 35 U.S.C. 154(b) by 6 days.

(21) Appl. No.: 18/037,690

(22) PCT Filed: Nov. 19, 2021

(86) PCT No.: PCT/IB2021/060744
§ 371 (c)(1),
(2) Date: May 18, 2023

(87) PCT Pub. No.: WO2022/107060
PCT Pub. Date: May 27, 2022

(65) Prior Publication Data
US 2024/0008582 A1    Jan. 11, 2024

(30) Foreign Application Priority Data

Nov. 19, 2020    (IT) .................. 102020000027792

(51) Int. Cl.
*A42B 3/32*    (2006.01)
(52) U.S. Cl.
CPC .................. *A42B 3/326* (2013.01)

(58) Field of Classification Search
CPC ......... A42B 3/326; A42B 3/324; A42B 3/322; A42B 3/32; A42B 3/205; A42B 3/18; A42B 3/30; A42B 3/04; A42B 3/20
See application file for complete search history.

(56) References Cited

U.S. PATENT DOCUMENTS 2,908,911 A  * 10/1959  Sowle .................. A42B 3/20
2/9
2022/0312883 A1 * 10/2022  Locatelli ............. A42B 3/30

FOREIGN PATENT DOCUMENTS

| CN | 104963926 A | * | 10/2015 | |
| EP | 0062163 A1 | | 10/1982 | |
| IT | 201900006914 A1 | | 11/2020 | |
| WO | WO-2013186190 A1 | * | 12/2013 | ............. A42B 3/30 |

OTHER PUBLICATIONS

International Search Report and Written Opinion issued Feb. 16, 2022 in PCT/IB2021/060744.

* cited by examiner

*Primary Examiner* — Uyen T Nguyen
(74) *Attorney, Agent, or Firm* — Panitch Schwarze Belisario & Nadel LLP

(57) ABSTRACT

A helmet includes a shell and a half chin bar releasably connected to the shell. The half chin bar is selectively connectable and disconnectable to and from the shell by means of an attachment device. The attachment device includes a coupling portion and a manual drive portion for the complete release of said coupling portion. The manual drive portion is accessible from the outside of the shell and/or the outside of the half chin bar.

7 Claims, 3 Drawing Sheets

HELMET PROVIDED WITH A HALF CHIN BAR

CROSS-REFERENCE TO RELATED APPLICATIONS

This application is a Section 371 of International Application No PCT/IB2021/060744, filed Nov. 19, 2021, which was published in the English language on May 27, 2022, under International Publication No. WO 2022/107060 A1, which claims priority under 35 U.S.C. § 119 (b) to Italian Application No. 102020000027792, filed Nov. 19, 2020, the disclosures of each of which are incorporated herein by reference.

FIELD OF THE INVENTION

The present invention concerns a protective helmet provided with a half chin bar that can be used in the automotive sector of racing and sports competitions, specifically in, but not limited to, the rally sector. However, applications of the present invention are not excluded also in the field of sports motorcycling or in other sectors that envisage the use of protective helmets.

BACKGROUND OF THE INVENTION

In sports car racing, the use is known of a protective helmet by a user, for example a driver and/or co-driver navigator.

Typically, the helmet comprises a protective cap, or shell, which has a lower aperture to insert the head and a front aperture suitable to guarantee a field of vision for the user.

So-called integral helmets exist, in which the front aperture appears as a band in the zone surrounding the eyes, limited at the bottom by an element to protect the chin, also called chin bar, continuous on one side and the other of the shell and integral with it.

Open helmets, or "jet helmets", are also known, in which the chin bar is not normally provided, and in which the front and bottom aperture constitute a single continuous aperture. These helmets have the advantage that they give greater comfort and freedom to the user, while providing less protection than full-face helmets.

In sports car racing, in particular in the rally sector, the use of a particular helmet is known in which there is a half chin bar formed by a monolithic arm that extends cantilevered from one side of the front aperture and substantially terminating in correspondence with the user's mouth.

An important aspect related to helmets provided with a half chin bar is linked to their lack of safety during motor racing, especially in the event of an accident.

For example, in the event of an accident, the half chin bar can attach itself to elements present in the passenger compartment, such as the spokes of the steering wheel, belts, arms, roll bars, or even to flying objects moved in the passenger compartment. In such circumstances, the attachment of the half chin bar can cause torsional impulses, or even real torsions of the entire helmet, which affect the user's vertebrae.

It is also known that the half chin bar must be able to be removed, or at least distanced, from the user's face quickly and easily in the phases immediately following an accident, moving the user's head and neck as little as possible, so as not to risk aggravating any possible injuries.

Removing or moving the half chin bar may in fact be necessary to facilitate breathing, or to perform rescue operations, such as the application of an external respirator or an oxygen mask.

One disadvantage of known helmets is that, in these circumstances, the half chin bar can represent an obstacle for access to the user's face by rescuers.

Some solutions provide to use mobile half chin bars, for example hinged on the lateral portions of the shell of the helmet and rotatable upward or downward.

These solutions have the disadvantage that, in the event that the accident involves impacts or collisions in correspondence with the portions in which the half chin bar is pivoted to the shell, rotation could be limited or prevented.

Other known solutions provide that the half chin bar comprises a yielding portion, for example made of a softer (or more fragile) material than the material of which the other portions of the helmet are made and/or that comprises preferential breaking profiles.

In these cases, in the event of an accident, the yielding portion of the half chin bar could promote its detachment, effectively transforming it into a blunt instrument that could cause injury to the user. On the other hand, if the half chin bar remains connected to the helmet, in order to remove it rescuers must apply sufficient force to break the yielding portion, with the risk of causing, or aggravating, any injuries possibly sustained by the user.

These solutions also have the disadvantage that the helmet cannot be reused following accidental breakage or slight damage of the yielding portion.

Solutions are also known in which the half chin bar is connected to the helmet by means of mechanical connection elements. Generally, in these solutions, both for aesthetic and functional reasons, the connection elements are disposed inside the shell or, at least, are covered by protection elements, such as plastic caps in turn connected to the shell. In the event of an accident, these solutions are particularly disadvantageous since, in order to remove the half chin bar, tools are required, such as screwdrivers or mechanical wrenches, suitable to maneuver the connection elements. These tools may not be immediately available to rescuers, thus slowing down rescue operations.

There is therefore a need to perfect a helmet which can overcome at least one of the disadvantages of the state of the art.

It is therefore a purpose of the present invention to provide a helmet which is safer than helmets known in the state of the art, in particular in the event of an accident.

In particular, one purpose of the present invention is to provide a helmet in which the half chin bar can be removed quickly and easily from the user's face, in particular in the event of an accident.

Another purpose of the present invention is to provide a helmet in which the half chin bar can be removed without the use of tools.

Another purpose of the present invention is to achieve the above purposes, and others besides, without compromising the safety of the helmet, and in particular the characteristics of resistance to impacts.

The Applicant has devised, tested and embodied the present invention to overcome the shortcomings of the state of the art and to obtain these and other purposes and advantages.

SUMMARY OF THE INVENTION

The present invention is set forth and characterized in the independent claim. The dependent claims describe other characteristics of the present invention or variants to the main inventive idea.

In accordance with the above purposes, a helmet provided with a half chin bar is described, hereafter helmet, which overcomes the limits of the state of the art and eliminates the defects present therein.

In accordance with some embodiments, a helmet is provided comprising a shell suitable to contain the head of a user inside it.

According to one aspect of the invention, the helmet also comprises a half chin bar selectively connectable/disconnectable to/from the shell by means of an attachment device comprising a coupling portion and a manual drive portion for the complete release of the coupling portion, accessible from the outside of the shell and/or of the half chin bar. In particular, the half chin bar can be connected/disconnected to/from the shell by a user, by manually acting on the manual drive portion of the attachment device.

By virtue of the fact that the manual drive portion is disposed outside the shell and does not require specific tools to be maneuvered, the removal of the half chin bar is simple and immediate.

In preferred embodiments, the attachment device comprises a first attachment element, with which the manual drive portion is integral, and which is suitable to couple to a second attachment element integrated in the shell. In addition, the half chin bar can comprise a passage hole mating with the second attachment element, and, in an attached configuration, the first attachment element passes through the passage hole and is engaged with the second attachment element.

The first attachment element can also comprise a flange suitable to press the half chin bar toward the shell when the helmet is in the attached configuration and, in preferred embodiments, the manual drive portion is disposed in the proximity of the flange. In particular, the manual drive portion can comprise a gripping flap manually mobile from a passive position, in which it is substantially parallel to the half chin bar, to a drive position, in which it is substantially perpendicular to the half chin bar.

Preferably, the half chin bar can develop in a single body from a free end to an attachment end and the shell can comprise an attachment seating with a shape at least partly mating with that of the attachment end.

Furthermore, in some embodiments, the attachment seating comprises interlocking means suitable to define a same-shape coupling between the half chin bar and the shell. In particular, the attachment end of the half chin bar can comprise at least one shaped protruding part suitable to be inserted in a suitable hollow comprised in the interlocking means.

BRIEF DESCRIPTION OF THE DRAWINGS

These and other aspects, characteristics and advantages of the present invention will become apparent from the following description of some embodiments, given as a non-restrictive example with reference to the attached drawings wherein.

FIGS. from 1 to 4 are schematic representations of a helmet according to the present invention in different operating conditions.

Figure 1:
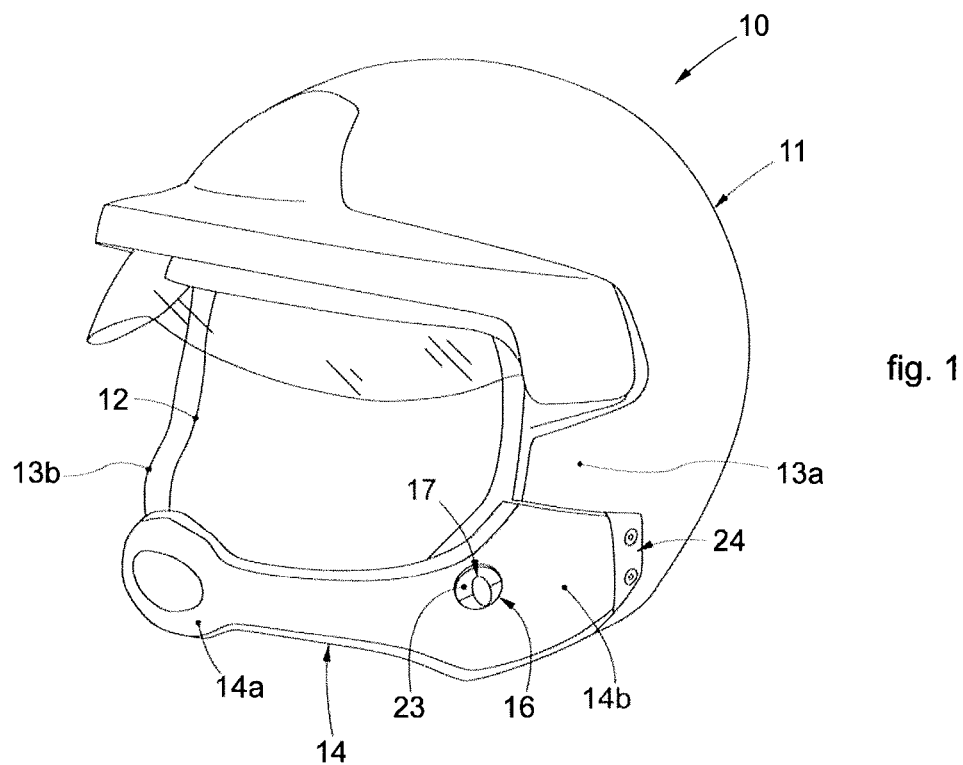
Figure 2:
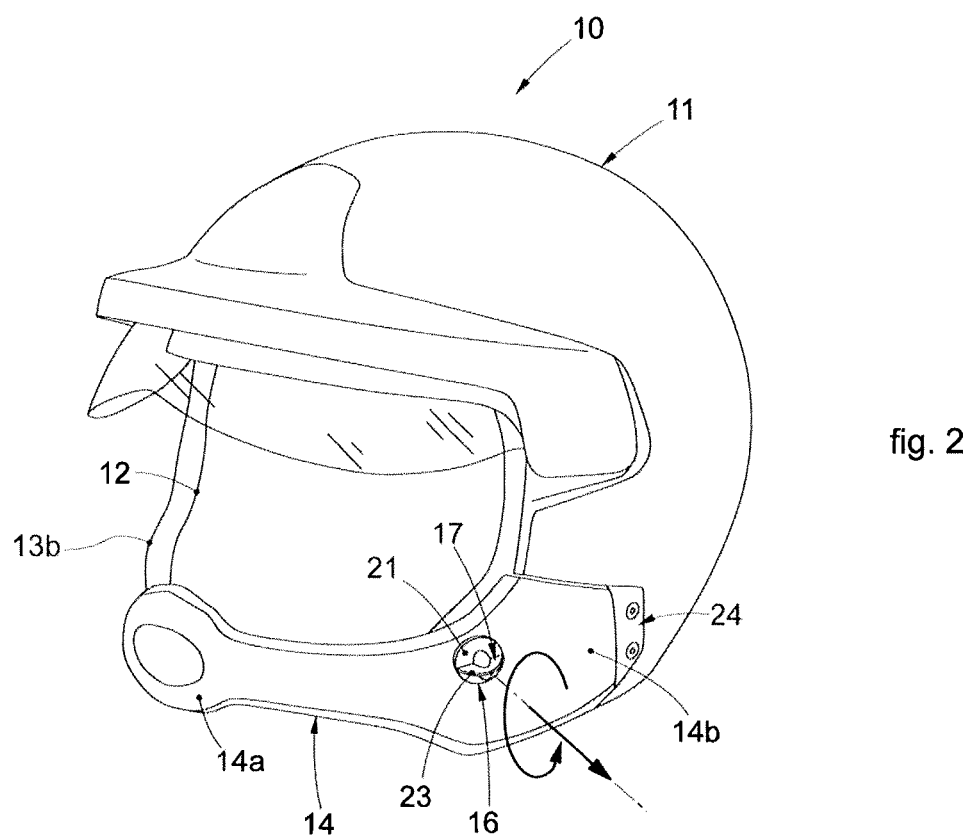
Figure 3:
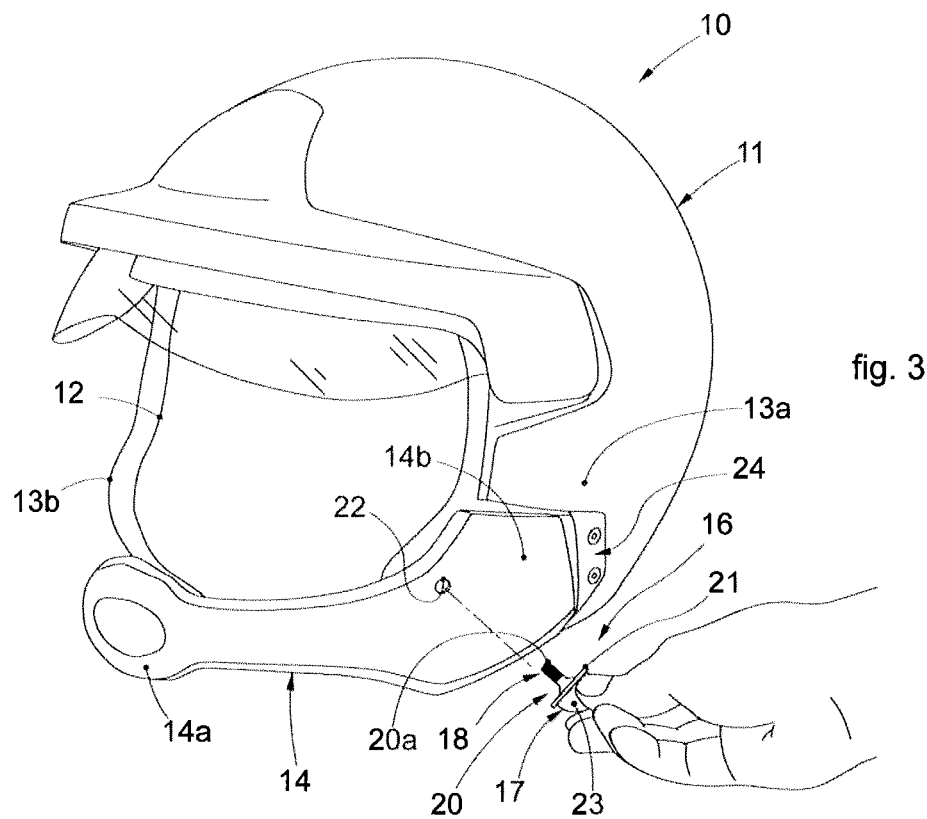

To facilitate comprehension, the same reference numbers have been used, where possible, to identify identical common elements in the drawings. It is understood that elements and characteristics of one embodiment can conveniently be combined or incorporated into other embodiments without further clarifications.

DETAILED DESCRIPTION OF SOME EMBODIMENTS

We will now refer in detail to the possible embodiments of the invention, of which one or more examples are shown in the attached drawings, by way of a non-limiting illustration. The phraseology and terminology used here is also for the purposes of providing non-limiting examples.

Referring to FIGS. 1-4, the number 10 indicates a helmet 10 provided with a half chin bar 14, hereafter helmet 10, which satisfies the purposes described above.

The helmet 10 described here can be used preferably in the field of motor racing, but also in other fields, such as for example motorcycling or the practice of winter sports, such as skiing or snowboarding, or even the practice of paragliding or other sports activities, either civilian or professional, which require the use of protective helmets of the type in question.

The helmet 10 of the present invention comprises a shell 11 suitable to wrap at least a portion of a user's skull and a padding 12 provided inside the shell 11. During use, a portion of the user's skull is inside the shell 11 and adheres to the padding 12.

The shell 11 can be provided with a pair of lateral extensions 13a, 13b which at least partly wrap the lateral parts of the user's skull, and which laterally delimit a front aperture of the helmet 10. The shell 11 and the lateral extensions 13a, 13b can be made in a single body and with materials suitable to provie protection to the user in the event of an accident, for example polymer materials, resins, composite materials, carbon fiber, or combinations thereof.

On the other hand, the padding 12 can be made of materials suitable to improve comfort for the user and to partly absorb shocks and impacts associated with possible accidents.

The helmet 10 also comprises a half chin bar 14 associated with the shell 11, in particular with one of the lateral extensions 13a, 13b. It is clear that a half chin bar 14 can be mounted indifferently on one or on the other of the lateral extensions 13a, 13b.

The half chin bar 14 can comprise a covering layer, for example made of polymer material, composite material or carbon fiber, and one or more plastic bodies, which can be conformed to give the half chin bar 14 suitable shapes and sizes. Furthermore, the half chin bar 14 can comprise a microphone and/or bodies or assemblies configured to house and/or serve the microphone, such as for example a filter to reduce background noise during transmission, devices for improving the quality of the audio signal, electric power cables, digital processing devices and more.

According to some embodiments, the half chin bar 14 is mounted in a cantilevered releasable way and protruding with respect to the shell 11, and extends from a free end 14a positioned, during use, in correspondence with the user's mouth to an attachment end 14b associated with the shell 11.

According to one aspect of the invention, the half chin bar 14 is connectable/disconnectable to/from the shell 11 by means of an attachment device 16 comprising a coupling portion 20 and a manual drive portion 17. In particular, the manual drive portion 17 is suitable for the complete release of the coupling portion 20 and is accessible from the outside of the shell 11 and/or of the half chin bar 14.

By virtue of this, it is possible to define an attached configuration of the helmet 10 in which the half chin bar 14 is connected to the shell 11, and a detached configuration of the helmet 10 in which the half chin bar 14 is disconnected from the shell 11. In particular, in the attached configuration the manual drive portion 17 of the attachment device 16 is outside the shell 11.

Figure 4:
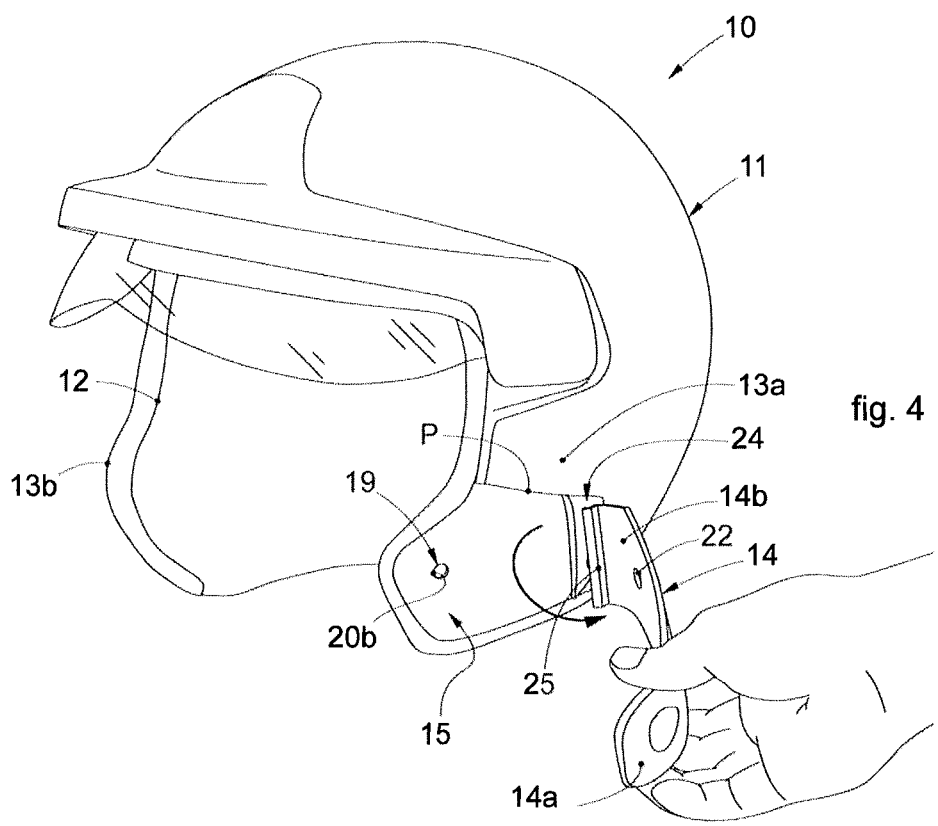

By way of a non-limiting example, FIG. 1 shows the helmet 10 in the attached configuration, while FIG. 4 shows the helmet 10 in the detached configuration.

In some embodiments, the attachment device 16 can comprise a first attachment element 18 suitable to couple to a second attachment element 19 integrated in the shell 11.

Figure 5:
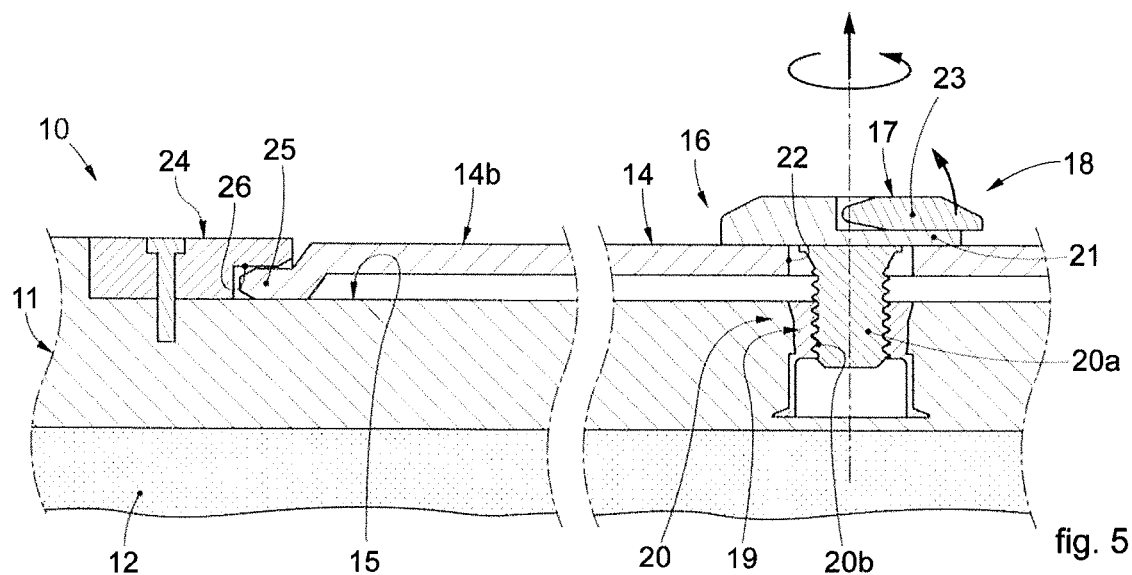
FIGS. 5 and 6 are schematic representations of a section of the helmet of the present invention in different operating conditions.
Figure 6:
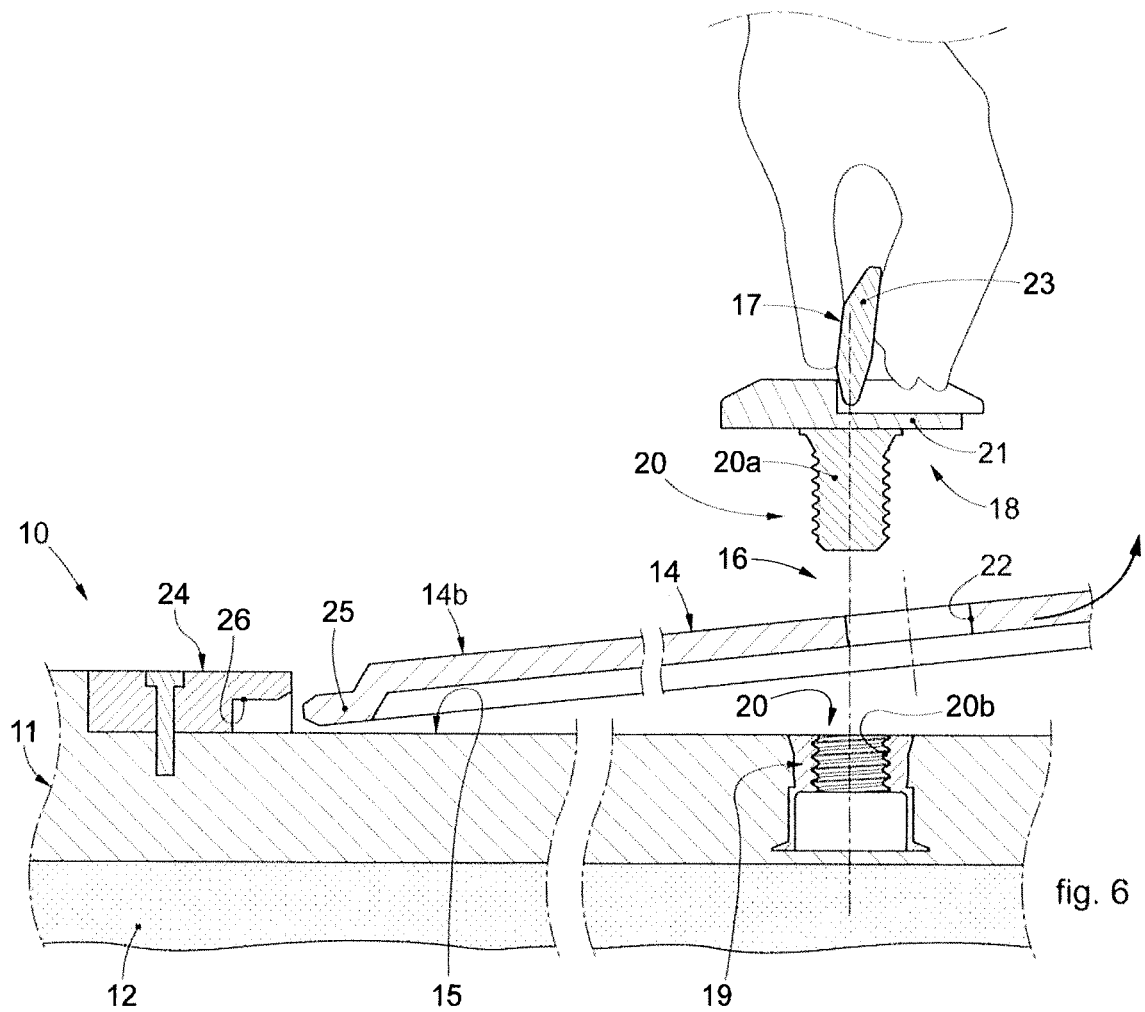

In this specific case, with reference to FIGS. 5-6, the first attachment element 18 and the second attachment element 19 respectively comprise a threaded shank and a threaded hole 20b, which constitute the coupling portion 20.

Purely by way of example, the second attachment element 19 can be directly laminated into the shell 11 during the manufacturing thereof or, alternatively, inserted therein through deformation.

Furthermore, the half chin bar 14 can also comprise a passage hole 22 for the first attachment element 18. In particular, in the attached configuration of the helmet 10, the passage hole 22 can be substantially overlapping with the second attachment element 19 and is passed through by the first attachment element 18 which, with the threaded shank 20a, engages the threaded hole 20b of the second attachment element 19.

According to some embodiments, the first attachment element 18 can comprise a flange 21 disposed substantially opposite to the threaded shank 20a. The flange 21 acts on the half chin bar 14 by pressing it from the outside toward the shell 11 (FIG. 5), stabilizing its connection. In other words, in the attached configuration, the half chin bar 14 is interposed between the flange 21 and the shell 11.

In accordance with preferred embodiments, the manual drive portion 17 of the attachment device 16 is integral with the first attachment element 18 and is disposed substantially in correspondence with the flange 21.

This conformation is advantageous since, in the attached configuration of the helmet 10, the manual drive portion 17 is outside the shell 11, making the attachment device 16 immediately accessible. This allows rescuers to remove the half chin bar 14 safely, easily and quickly in the event of an accident, without requiring the helmet 10, and therefore the user's head, to be subjected to significant exertions that could compromise the health of the user.

In this specific case, the manual drive portion 17 can comprise a gripping flap 23 manually mobile from a passive position to a drive position. In the passive position, the gripping flap 23 is substantially parallel to the flange 21 (FIG. 5), while during use it is substantially perpendicular to the flange 21 (FIG. 6). When the gripping flap 23 is in use, that is, in the drive position, the manual drive portion 17, and therefore the first attachment element 18, can be maneuvered manually without requiring the use of screwdrivers or special tools. This further speeds up any rescue interventions, allowing, for example, to reduce the time required to clear the respiratory tract of the user of the helmet 10.

In some embodiments, at least one of the lateral extensions 13a, 13b of the shell 11 can comprise an attachment seating 15 suitable to accommodate the attachment end 14b of the half chin bar 14. The attachment seating 15 can be of a shape at least partly mating with that of the attachment end 14b of the half chin bar 14. In particular, the attachment seating 15 can be configured as a hollow made in the shell 11, the perimeter P of which at least partly follows that of the attachment end 14b.

This conformation is advantageous since it allows to facilitate the centering of the passage hole 22 with the second attachment element 19 during the connection of the half chin bar 14 to the shell 11.

In other embodiments, the attachment seating 15 can comprise interlocking means 24 suitable to define a same-shape coupling with the attachment end 14b of the half chin bar 14. In fact, the attachment end 14b can comprise one or more protruding parts 25 with a shape mating with the interlocking means 24. In particular, with reference to FIGS. 5-6, the protruding part 25 can be inserted in a suitable hollow 26 comprised in the interlocking means 24.

This conformation allows to define a preliminary alignment coupling between the half chin bar 14 and the shell 11, facilitating the subsequent insertion of the first attachment element 18 in the passage hole 22 and in the second attachment element 19.

Once inserted, the first attachment element 18 can be manually maneuvered by means of the manual drive portion 17 and in particular the gripping flap 23, in order to engage the threaded hole 20b of the second attachment element 19 with the threaded shank 20a.

For example, the first attachment element 18 can be screwed manually by acting through the gripping flap 23. Once the coupling between the first attachment element 18 and the second attachment element 19 has been defined, the gripping flap 23 can be taken from the drive position to the passive position.

On the other hand, in order to disconnect the half chin bar 14, a user can manually take the gripping flap 23 from the passive position to the drive position, and by means of the same gripping flap 23 manually maneuver the first attachment element 18 in order to disengage it from the second attachment element 19.

For example, the first attachment element 18 can be manually unscrewed by acting through the gripping flap 23. Once disengaged from the second attachment element 19, the first attachment element 18 can be extracted from the passage hole 22 and the half chin bar 14 can be disconnected from the shell 11.

The person of skill in the art will easily understand that the half chin bar 14 can be connected/disconnected several times from the shell 11 without compromising the solidity and resistance characteristics of the helmet 10. This allows to replace the half chin bar 14 whenever necessary, for example if slightly damaged or, on each occasion, depending on the use of the helmet 10.

It is clear that modifications and/or additions of parts may be made to the helmet 10 as described heretofore, without departing from the field and scope of the present invention as defined by the claims.

In the following claims, the sole purpose of the references in brackets is to facilitate reading: they must not be considered as restrictive factors with regard to the field of protection claimed in the specific claims.

The invention claimed is:

1. A helmet (10) comprising a shell (11) and a half chin bar (14) releasably connected to said shell (11), wherein said half chin bar (14) is selectively connectable/disconnectable to/from said shell (11) by means of an attachment device (16) comprising a coupling portion (20) and a manual drive portion (17) for a complete release of said coupling portion (20), said manual drive portion (17) being accessible from an outside of said shell (11) and/or of said half chin bar (14), wherein said half chin bar (14) develops from a free end (14a) to an attachment end (14b), wherein said shell (11) comprises an attachment seating (15) with a shape at least partly mating with a shape of said attachment end (14b), wherein a first attachment element (19) is disposed in said attachment seating (15), wherein said attachment seating (15) comprises interlocking means (24) for coupling said shell (11) to the attachment end (14b) of the half chin bar (14), and wherein said attachment end (14b) comprises at least one shaped protruding part (25) suitable to be inserted in a suitable hollow (26) comprised in said interlocking means (24), wherein upon release of said coupling portion (20) of said attachment device (16), the half chin bar (14) is configured to be disconnected from the shell (11) by withdrawal of the at least one shaped protruding part (25) from the suitable hollow (26).

2. The helmet (10) as in claim 1, wherein said attachment device (16) comprises a second attachment element (18) suitable to couple with said first attachment element (19) integrated in said shell (11) wherein said manual drive portion (17) is integral with said second attachment element (18).

3. The helmet (10) as in claim 2, wherein said half chin bar (14) is connected to said shell (11) in an attached configuration, wherein said half chin bar (14) comprises a passage hole (22) mating with said first attachment element (19) wherein said second attachment element (18) passes through said passage hole (22) engaging with said first attachment element (19).

4. The helmet (10) as in claim 3, wherein said second attachment element (18) comprises a flange (21) suitable to press said half chin bar (14) toward said shell (11) when the helmet (10) is in the attached configuration.

5. The helmet (10) as in claim 1, wherein said manual drive portion (17) comprises a gripping flap (23) manually mobile from a position substantially parallel to a flange (21) to a position substantially perpendicular to said flange (21).

6. The helmet (10) as in claim 5, wherein said manual drive portion (17) is disposed in a proximity of said flange (21).

7. The helmet (10) as in claim 1 wherein said shell (11) comprises two lateral extensions (13a, 13b) laterally defining a front aperture of the helmet (10), wherein said attachment seating (15) is disposed on one of said lateral extensions (13a, 13b) and is configured as a hollow having a perimeter (P) at least partly mating with a perimeter of said attachment end (14b).

* * * * *